Figure 1:
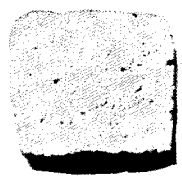
Figure 4:
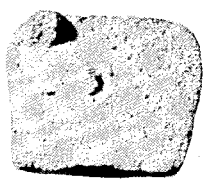
Figure 2:
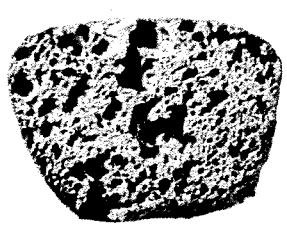
Figure 5:
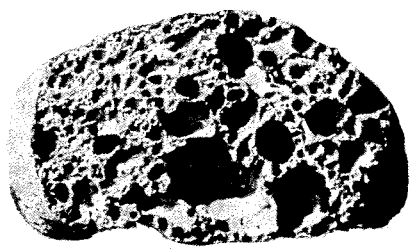
Figure 3:
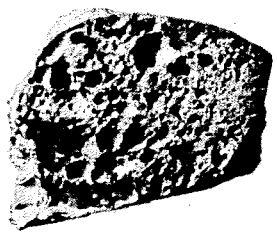
Figure 6:

June 6, 1961 L. J. MINNICK 2,987,411
LIGHT WEIGHT AGGREGATE AND METHOD OF MAKING SAME
Filed Nov. 19, 1957 2 Sheets-Sheet 1

INVENTOR:
LEONARD JOHN MINNICK
BY *Howson & Howson*
ATTYS.

June 6, 1961 L. J. MINNICK 2,987,411
LIGHT WEIGHT AGGREGATE AND METHOD OF MAKING SAME
Filed Nov. 19, 1957 2 Sheets-Sheet 2

INVENTOR:
LEONARD JOHN MINNICK
BY Howson & Howson
ATTYS.

United States Patent Office 2,987,411
Patented June 6, 1961

2,987,411
LIGHT WEIGHT AGGREGATE AND METHOD OF MAKING SAME
Leonard John Minnick, Cheltenham, Pa., assignor to G. & W. H. Corson, Incorporated, Plymouth Meeting, Pa., a corporation of Delaware
Filed Nov. 19, 1957, Ser. No. 697,462
14 Claims. (Cl. 106—288)

The present invention relates to a novel light-weight aggregate and to the method of making the same; and, more particularly, the invention relates to a novel light-weight aggregate prepared from relatively inexpensive materials, one of which is presently a more or less waste material, and possessing other unexpected advantageous properties.

The production of light-weight aggregates, which find application in concrete units, concrete floor slabs, and the like, where saving in weight is important, is well known, and involves basically, the application of heat to silicious materials to convert them to a plastic or fluid state and to cause the resulting plastic or fluid material to expand by virtue of the evolution of gas. Thus, when molten slag is dropped into water, the steam which is generated permeates through the molten slag mass causing it to bloat, and the resulting cellular structure is retained upon the solidification of the slag. In much the same way, volcanic ash forms cellular structures while in the molten state due to the generation of gas pressure either from water contained therein or from other volatile gaseous components.

Certain clays and shales can be converted by heat to bloated light-weight products. Unfortunately, these shales and clays are relatively scarce. They are to be found only in selected areas, and even when found they are frequently far from uniform in their characteristics. Furthermore, many of these clays and shales require for melting higher temperatures than are suited to the formation of the most desirable structural characteristics, that is, pores or cells, a substantial portion of which are of a relatively uniform fine size, uniformly dispersed throughout the mass, since the rate of evolution of gas will be so much increased at the higher temperatures that the cells or pores in the cellular product will be of relatively large size interspersed with solid portions of considerable bulk density. This means that when the material is crushed to produce aggregate of definite size, there is a tendency to dust and to convert to a more dense type product with a size relationship that is not satisfactory.

It has been suggested that light-weight aggregate products may be prepared by firing fly ash. Fly ash is the finely-divided ash material carried in the stack gases from the furnaces of power plants which consume powdered coal, and is collected before it leaves the stack usually in electrostatic precipitators, or other type of collectors. The problem involved in disposal of the fly ash is very great because the tonnage produced in some of the utility companies is very high. Numerous attempts have been made to utilize this material, and the suggestion that light-weight aggregate materials might be prepared by firing the fly ash is a result of such an attempt. However, fly ash being a very finely-divided dust, is very difficult to handle. Thus when attempts are made commercially to produce a light-weight aggregate from fly ash, many difficulties are encountered which have, up to the present time, prevented the successful manufacture of a light-weight cellular product from fly ash.

It is the principal object of the present invention to provide a novel light-weight aggregate product and a method for preparing the same.

It is another object of the present invention to provide a novel light-weight aggregate product from relatively inexpensive materials including fly ash.

Still another object of the present invention is to provide a light-weight aggregate which can be prepared at temperatures conducive to the formation of a product containing pores or cells substantially uniformly dispersed throughout the aggregate mass.

Other objects will become apparent from a consideration of the following specification and the claims.

The product of the present invention is prepared by firing in a substantially non-oxidizing atmosphere an intimate mixture comprising fly ash and a material selected from the group consisting of clay, shale and mixtures thereof. The resulting product is a vesicular body composed of discrete cells the wall of which comprise a fused mixture of fly ash and clay and/or shale.

Reference may be made to FIGURES 1 to 7 which are cross sections of fired products, some of which have been prepared in accordance with the present invention as more fully discussed hereinafter.

It has been found when fly ash is intimately mixed with clay and/or shale, and the resulting mixture is fired in a substantially non-oxidizing atmosphere at temperatures of from about 1500° to about 2400° F., a superior, light-weight cellular material is produced. By the expression "non-oxidizing atmosphere" as employed in this specification and claims is meant an atmosphere which is substantially free of a gas, such as oxygen or the like, which may cause oxidation of the materials of which the light-weight aggregate is composed. Such non-oxidizing atmosphere may be substantially chemically neutral or reducing.

During firing of the mixture of fly ash and clay and/or shale in a non-oxidizing atmosphere, an outer skin is formed which acts as a seal substantially to prevent or to minimize the escape of gases generated within the aggregate material by decomposition of the fly ash and clay and/or shale. The gases so generated are entrapped within the aggregate material and form pores or cells. Since ferrous iron, one of the chemical constituents of fly ash, acts as a flux facilitating the melting of the aggregate composition, the temperatures employed during the firing operation are on the lower end of the range for production of materials of this type, and therefore, the aggregate does not consist of areas of considerable bulk density intrespersed with a relatively small number of very large cells. Rather, the pores or cells formed in the light-weight aggregates produced according to the method of this invention are, for the most part, entirely non-connected and uniformly distributed throughout the entire body of the aggregate. Thus, the aggregate does not have areas of considerable bulk density.

Because of these facts the light-weight aggregate thus produced may have a bulk density as low as about 30 lbs./cu. ft. Also, aggregate particles of a smaller size produced by crushnig larger aggregate particles will, because of the substantially uniform cell distribution within the larger particles, have substantially the same bulk density as the larger particles. Since the fly ash is mixed with shale and/or clay, no handling problems during firing are involved due to the dust-like nature of fly ash.

Referring specifically to fly ash, it is, as stated, the dust-like material collected from the stack gases leaving the furnaces of power plants which consume coal, specially powdered coal. Chemically, fly ash is essentially in iron aluminum silicate, containing minor proportions of alkalis and carbon. The carbon contents of the fly ash represents that portion of the carbon of the original coal that did not burn during the combustion in the furnace due to the short time of exposure of the coal to combustion temperatures and to inefficient operation. Hence, depending on these and other factors, the fly ash may contain from as little as about 1–2% up to as high as even 50–70%, by weight of carbon in isolated instances. Most generally, however, fly ash will contain less than about 20–25% of carbon. A typical fly ash analysis is as follows: $SiO_2$, 34.01%; $Al_2O_3$, 20.15%; $Fe_2O_3$, 26.43%; CaO, 7.66%; MgO, 1.63% and $SO_3$, 1.34%. This fly ash has a loss on ignition of 4.72% and a fixed carbon content of 3.96%. The balance is 0.41% of moisture and 1.39% of exchangeable alkali.

The fly ash may be used directly as obtained from the stack gases without treatment to reduce its particle size. Generally, at least the preponderant portion of the fly ash particles will pass through a 325 mesh screen, and the majority of these are sub-micron in size. Since the fly ash particles are friable in nature, they may become reduced further in size during the mixing with the clay and/or shale.

Reference has been made above to the iron and carbon contents of the fly ash. The iron oxide of the fly ash exists in both ferrous and ferric state. As mentioned previously, the ferrous iron is believed to be beneficial serving as a flux thereby facilitating the melting of the fly ash and the clay and/or shale. Fly ash which contains high ferrous iron shows advantage, and fly ash containing substantial amounts of carbon within the range set forth above is advantageous.

The clays and/or shales that may be employed in accordance with the present invention, may be any of the common clays (including loams) and shales. Especially desirable are those clays and shales which have some bloatable characteristics in and of themselves. As stated, such clays and shales are not suited for the commercial production of light-weight aggregate by themselves either because they do not swell to the proper extent or the temperatures required for sufficient bloating are so high that the cell structure is poor. The combination of the fly ash with such clays and shales, however, when fired in a substantially non-oxidizing atmosphere, readily fuses at those more moderate temperatures which result in optimum cell formation. The type of shale or clay employed has also been found to be a factor in the ultimate properties of the product. Thus, those shales that show poor exfoliating characteristics require more fly ash than those which show better expanding properties.

The relative proportions between the fly ash and the clay and/or shale may vary somewhat depending for example, upon the characteristics of the shale and/or clay employed, upon the ferrous iron content of the fly ash, upon the firing temperature employed, upon the particular characteristics desired in the product, and the like. Generally, for a given firing temperature and clay or shale the greater quantity present of a fly ash of a stated ferrous iron content, the greater will be the average cell size. Thus, where available firing equipment necessitates the use of a relatively limited range of firing temperatures, the desired cell size may be obtained by varying the amount of fly ash in the aggregate. In general, the fly ash will be present in an amount between about 5% and about 90%, based on the combined weight of the solid materials employed. In order to prevent laminations, which often occur during extrusion of the aggregate mix when extrusion is used during shaping of the aggregate, amounts of fly ash not substantially below about 5% should be employed. Likewise, in order to avert difficulties in handling of the fly ash, the amount of this material present should not be substantially greater than about 90%. For most purposes, it is preferred to use between about 20% and about 80% of fly ash.

The amount of clay and/or shale employed may vary considerably, and the amount selected may be governed by the same considerations mentioned above in connection with the proportion of fly ash. Thus, the amount of clay and/or shale may range from as low as about 10%, by weight, up to about 95%; preferably between about 20% and about 80%.

Other materials may be employed in addition to the fly ash and clay and/or shale in making the light-weight aggregate of this invention. For example, coal-ash slag, i.e., that portion of the ash that does not leave the furnace with the stack gases, but is cooled from the molten state, for example, by being dropped into water beneath the furnace, may be employed in preparing the aggregate. Coal-ash slag represents a readily available, inexpensive material which can replace a portion of the conventional clay and/or shale. It has been found that the slag may be employed in amounts up to about 50%, by weight, based upon the combined weight of solid materials. Preferably, however, where slag is employed, it will not make up more than about 30%, by weight, of its combined weight of solid materials. Other materials such as pumice, lava and the like may be employed provided they do not adversely affect the advantageous properties of the light-weight aggregate of this invention.

In preparing the light-weight aggregate in accordance with this invention, to a large degree conventional procedures may be followed. Thus, the various ingredients may be initially mixed in the dry state, for example, in a dry pan. On the other hand, the ingredients may be mixed in the wet state by adding water and employing, for example, a wet pan, edge runner type mill, pug mill, or pelletizer. When the ingredients are first dry mixed, the mixture may be further mixed in a wet state followed by the addition of water in, for example, a pug mill. At any rate, there must ultimately be formed an intimate mixture of all the ingredients with sufficient water to provide a cohesive mass or body.

The amount of water which is used to form the moldable mass will be sufficient, as is well known, to permit the resulting mass to be shaped in the equipment used. When a dry mass is used, for example, the water content may be as low as about 6% to 8%, and when a pelletizer is used about 15–17% water is generally employed. In the use of extrusion machines, on the other hand, for example, the conventional De-Airing machine, the water content of the mass may be somewhat higher and may range up to about 25%. The mixing step, and the shaping step follow conventional practices and will represent no problem to those skilled in the art.

The drying of the shaped body may be accomplished in any conventional manner, for example, by placing the wet, shaped body on a rack and passing it through a tunnel dryer in which waste heat gases are employed to evaporate the water. The shaped bodies can also be dried in a zone of the kiln just before firing takes place. During drying the temperature employed will not exceed the boiling point of water. Following drying, the shaped body is fired in a non-oxidizing atmosphere.

The primary feature of this invention, as stated previously, is the firing of the mixture of fly ash and clay and/or shale in a substantially non-oxidizing atmosphere. The non-oxidizing atmosphere is substantially devoid of gases, such as oxygen, which would cause oxidation of the materials of the aggregate, as for example oxidation of the ferrous iron of the fly ash, which acts as a flux, to ferric iron. The non-oxidizing atmosphere may be substantially neutral, as for example an atmosphere containing substantially no oxygen and consisting of the products of complete combustion of solid, liquid or gaseous hydrocarbons, which combustion products include carbon dioxide, nitrogen and minor amounts of water vapor. A reducing atmosphere may also be employed. Such a reducing atmosphere may consist of the products of incomplete combustion of solid, liquid or gaseous hydrocarbons, which products include carbon monoxide, hydrogen, carbon dioxide and water vapor. Preferably a somewhat reducing atmosphere, such as that produced by the incomplete combustion of a hydrocarbon fuel, is employed.

As mentioned above, during firing of the mixture of fly ash and clay and/or shale in such non-oxidizing atmosphere, the fly ash fluxes and melts causing reaction with the clay and/or shale in proximity to it; also an outer skin is formed on the body which acts as a seal to prevent or hinder the escape of gases generated within the aggregate material by decomposition of the constituents of which the aggregate is formed. The gases so formed are entrapped within the aggregate material and form substantially uniformly distributed cells. In some cases bloating of the aggregate material takes place causing the body to swell in size. In other cases the bloating is counteracted by the normal tendency for the body to shrink during firing so that the overall size of the final body does not differ materially from that of the body before firing. The degree of bloating and extent of overall expansion of the body is determined by the temperature of firing and length of time of heating, the higher the temperature and longer the time of heating the greater the expansion. Because of the fluxing action of the ferrous iron which undergoes little or no oxidation to ferric iron due to the employment of a non-oxidizing atmosphere, the mixture of fly ash with clays and/or shales readily fuses, generates gas and hence forms cells at those more moderate temperatures which result in optimum cell formation.

Temperatures employed in firing of the aggregate body may be governed by such factors as those mentioned above with respect to the proportion of fly ash. The greater the amount of fly ash of a stated ferrous iron content employed, the lower will be the firing temperature required to produce an aggregate of a given bulk density. Of course, the use of a fly ash of a higher ferrous iron content and, thus, greater fluxing ability, will usually require lower temperatures to provide an aggregate of a given bulk density than the use of an equal amount of a fly ash of a lesser ferrous iron content. Generally, temperatures within the range from about 1500° to 2400° F., and preferably between about 1800° and 2200° F. may be employed. The use of temperatures substantially above about 2400° F. should be avoided in order to prevent formation of undesirable cell structures. Since the firing of the aggregate body is carried out in a substantially non-oxidizing atmosphere, kilns which can maintain such an atmosphere within the firing chamber must be employed. Satisfactory kilns for this purpose include sintering kilns, shaft kilns, rotary kilns and the like, which maintain a non-oxidizing atmosphere about the aggregate during firing. Preferably, the aggregate body is heated to the desired firing temperature as rapidly as possible.

The preparation of the product of the present invention will be more readily understood from a consideration of the following specific examples which are given for the purpose of illustration only and are not intended to limit the scope of the invention in any way.

*Example I*

An intimate mixture consisting of 10% of fly ash, based on combined weight of solid materials employed, and 90% Gwynedd Valley loam is obtained by milling these materials with a small amount of water. This mixture is formed into a substantially rectangular body and the body is dried in an oven. The dried body is then placed in a gas-fired kiln and heated to a temperature of about 2200° F. over a period of one hour. A reducing atmosphere is maintained in the kiln by combusting the gaseous fuel by which the kiln is heated in a quantity of air which is insufficient to cause complete combustion of the gaseous fuel. The aggregate formed upon cooling is a light-weight, bloated, vesicular, fused mixture of fly ash and shale.

The procedure of Example I is employed to produce a number of aggregate bodies which are illustrated in cross section in FIGURES 1–6. The aggregates of FIGURES 1–3 were fired in a reducing atmosphere at a temperature of 2100° F., whereas the aggregates of FIGURES 4–6 were similarly fired at a temperature of 2200° F. The aggregates illustrated in FIGURES 1 and 4 consist of 100% Gwynedd Valley shale; those illustrated in FIGURES 2 and 5 consist of 10% fly ash and 90% Gwynedd Valley shale, and those illustrated in FIGURES 3 and 6 consist of 20% fly ash and 80% Gwynedd Valley shale. These figures illustrate that at the firing temperatures employed the aggregates formed entirely of shale (FIGURES 1 and 4) do not form cells to any significant degree, whereas those aggregates containing fly ash undergo considerable bloating and have myriad cells distributed entirely throughout (FIGURES 2, 3, 5 and 6). In addition, the figures illustrate that for a given fly ash content increased bloating and cell formation occurs at higher firing temperatures. Likewise, for a given firing temperature, greater bloating and cell formation occurs in those aggregates containing the greater amount of fly ash. These figures represent almost the extreme bloating that will be provided and serve to illustrate the marked cell formation possible through the combination of fly ash and clay and/or shale when fired under the conditions specified herein. For most purposes a finer cell structure with cells of more uniform size is desirable and such a product is prepared in accordance with Example III and illustrated in FIGURE 7.

*Example II*

The procedure of Example I is repeated with a mixture consisting of 10%, by weight, of fly ash and 90% of potters clay. An aggregate consisting of a light-weight, bloated, vesicular fused mixture of fly ash and clay is obtained.

*Example III*

A 50–50 mixture of fly ash and Pennsylvania shale is prepared in a blender. The shale is first reduced in size so that no particles are greater than ⅛". 15–17% of water based on the weight of the fly ash-shale mixture is added to the mixture and the mixture is formed into substantially spherical pellets of about ⅜–⅝" in diameter. One hundred pounds of such pellets are placed in a vertical shaft kiln. The kiln is fired with propane to supply heat and to ignite carbon contained in the fly ash. Neutral to reducing atmosphere conditions are maintained in the kiln by controlling the amount of air admitted to below that required for complete combustion of the propane and carbon. The pellets are held for about one-half hour during which the temperature of the pellets rises to 2200° F. and then cools to where they can be discharged from the kiln.

Pellets so prepared are mixed with concrete to provide a light-weight concrete body.

Figure 7:
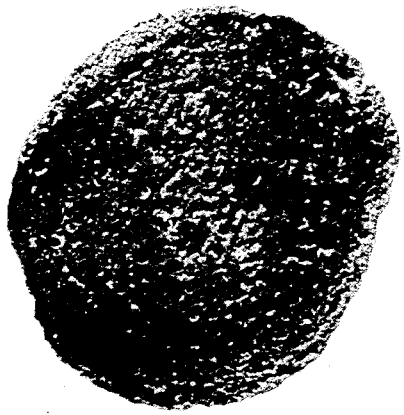

A cross sectioned (magnified) view of a typical pellet is shown in FIGURE 7. The cell size in this product is smaller and more uniform than those of the products of Example I.

Considerable modification is possible as for example in the selection of the particular type of clay and/or shale employed as well as in the proportions thereof to the fly ash without departing from the scope of the invention.

I claim:

1. The method of preparing a light-weight cellular composition which comprises firing in a substantially non-oxidizing atmosphere at a temperature between about 1500° and about 2400° F., a moldable mixture of fly ash, a material selected from the group consisting of clay, shale and mixtures thereof, and water, said fly ash being present in said mixture in an amount between about 5% and about 90%, by weight, based on the combined weight of solid materials.

2. The method of claim 1 in which said composition consists essentially of a mixture of fly ash, shale and water.

3. The method of claim 1 in which said composition consists essentially of a mixture of fly ash, clay and water.

4. The method of claim 1 in which said fly ash is present in said mixture in an amount between about 20% and about 80%, by weight, based on combined weight of solid materials, and said mixture is fired at a temperature between about 1800° and about 2000° F.

5. The method of claim 4 in which said composition consists essentially of a mixture of fly ash, shale and water.

6. The method of claim 4 in which said composition consists essentially of a mixture of fly ash, clay and water.

7. The method of preparing a light-weight cellular composition which comprises firing in a reducing atmosphere at a temperature between about 1500° and about 2400° F., a moldable mixture of fly ash, a material selected from the group consisting of clay, shale, and mixtures thereof, and water, said fly ash being present in said mixture in an amount between about 5% and about 90%, by weight, based on the combined weight of solid materials.

8. The method of claim 7 in which said composition consists essentially of a mixture of fly ash, shale and water.

9. The method of claim 7 in which said composition consists essentially of a mixture of fly ash, clay and water.

10. The method of claim 7 in which said fly ash is present in said mixture in an amount between about 5% and about 80%, by weight, based on combined weight of solid materials, and said mixture is fired at a temperature between about 1800° and about 2200° F.

11. The method of claim 10 in which said composition consists essentially of a mixture of fly ash, shale and water.

12. The method of claim 10 in which said composition consists essentially of a mixture of fly ash, clay and water.

13. As a new article of manufacture, a light-weight aggregate consisting essentially of a vesicular body containing discrete cells the walls of which comprise a fused mixture of fly ash, in which the iron content is substantially in the ferrous state, and a material selected from the group consisting of clay, shale and mixtures thereof, said fly ash making up between about 5% and about 90%, by weight, based on the combined weight of solid materials.

14. The product of claim 13 containing from about 5% to about 80% of fly ash, by weight, based on the combined weight of solid materials.

References Cited in the file of this patent

UNITED STATES PATENTS

| | | |
|---|---|---|
| 1,944,007 | Hobart | Jan. 16, 1934 |
| 2,544,752 | Gelbman | Mar. 13, 1951 |
| 2,691,598 | Meurice et al. | Oct. 12, 1954 |
| 2,776,210 | Bowers | Jan. 1, 1957 |
| 2,799,074 | Garloni | July 16, 1957 |